United States Patent
Chester et al.

(10) Patent No.: US 10,282,897 B2
(45) Date of Patent: May 7, 2019

(54) AUTOMATIC GENERATION OF THREE-DIMENSIONAL ENTITIES

(71) Applicant: Microsoft Technology Licensing, LLC, Redmond, WA (US)

(72) Inventors: Sam Chester, Birmingham (GB); Daniel James Chalk, Ibstock (GB); Iain McFadzen, Hinckley (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 39 days.

(21) Appl. No.: 15/439,537

(22) Filed: Feb. 22, 2017

(65) Prior Publication Data

US 2018/0240271 A1    Aug. 23, 2018

(51) Int. Cl.
G06T 15/00 (2011.01)
G06T 17/20 (2006.01)
G06T 13/40 (2011.01)

(52) U.S. Cl.
CPC .............. *G06T 17/20* (2013.01); *G06T 13/40* (2013.01); *G06T 2210/16* (2013.01)

(58) Field of Classification Search
CPC ......... G06T 19/00; G06T 17/20; G06T 17/00; G06T 15/10; G06T 15/00
USPC ....................................................... 345/419
See application file for complete search history.

(56) References Cited

U.S. PATENT DOCUMENTS

| | | | |
|---|---|---|---|
| 7,257,239 B2 | 8/2007 | Rowe et al. | |
| 8,047,915 B2 | 11/2011 | Lyle et al. | |
| 2002/0082077 A1 | 6/2002 | Johnson et al. | |
| 2005/0026685 A1 | 2/2005 | Ruark et al. | |
| 2007/0021200 A1 | 1/2007 | Fox et al. | |
| 2007/0060388 A1 | 3/2007 | Stelzer et al. | |
| 2007/0202484 A1 | 8/2007 | Toombs et al. | |
| 2007/0298866 A1 | 12/2007 | Gaudiano et al. | |
| 2008/0076519 A1 | 3/2008 | Chim | |

(Continued)

FOREIGN PATENT DOCUMENTS

| | | |
|---|---|---|
| WO | 1998035320 A1 | 8/1998 |
| WO | 2007081941 A2 | 7/2007 |
| WO | 2007130689 A2 | 10/2008 |

OTHER PUBLICATIONS

Blyth, M.G., etc. A Lobatto interpolation grid over the triangle IMA Journal of Applied Mathematics Advance Access published Mar. 16, 2005 [Retrieved online], Retrieved on May 24, 2018. Website <URL:https://ieeexplore.ieee.org/document/8133605>.*

(Continued)

*Primary Examiner* — Gordon Liu

(57) ABSTRACT

A method of automatically generating a three-dimensional entity is described. A sequence is generated comprising sets of blend shapes in order of increasing priority. Each set of blend shapes comprises one or more blend shape identifiers and parameters defining candidate blend weights for each blend shape. For each of the sets of blend shapes in the sequence and in order of increasing priority: the one or more blend shape identifiers in the set are added to a set of blend shapes for the entity. Dependent upon whether blend shape identifier that is added is already present in that set, the parameters for the blend shape are either added or updated. One or more blend shapes from the set of blend shapes for the entity are then added to a mesh of the entity using a randomization method and the resultant mesh is stored in memory.

20 Claims, 11 Drawing Sheets

(56) References Cited

U.S. PATENT DOCUMENTS

2016/0026926 A1* 1/2016 Yeung ................ G06Q 30/0269
                                                        706/12
2017/0069124 A1* 3/2017 Tong ........................ G06T 13/40
2018/0047192 A1* 2/2018 Kristal .................... G06T 11/60

OTHER PUBLICATIONS

Vinayagamoorthy, et al., "Building Expression into Virtual Characters", In Proceedings of Annual Conference of the European Association for Computer Graphics, Sep. 4, 2006, 41 pages.

* cited by examiner

US 10,282,897 B2

AUTOMATIC GENERATION OF THREE-DIMENSIONAL ENTITIES

BACKGROUND

Different three-dimensional computer generated characters may be generated by applying one or more blend shapes (which may also be referred to as morph targets) to a base mesh. A blend weight for a blend shape determines the amount of influence the blend shape has on a base mesh for a three-dimensional character and typically the blend weight is between zero (which indicates that the blend shape is not applied to the base mesh) and one. In many situations, the blend weights are set manually (e.g. by an artist who is designing the three-dimensional character); however, where the character is automatically generated, random numbers may be used to set the blend weights. Having applied the blend shapes using the blend weights, the resultant three-dimension character may be rendered on a screen, e.g. as part of a computer animation, computer game or other graphical user interface.

The embodiments described below are not limited to implementations which solve any or all of the disadvantages of known systems and methods for automatically generating three-dimensional characters or other three-dimensional entities (e.g. inanimate objects).

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method of automatically generating a three-dimensional entity (e.g. a character) is described. A sequence is generated comprising sets of blend shapes in order of increasing priority. Each set of blend shapes comprises one or more blend shape identifiers and parameters defining candidate blend weights for each blend shape. For each of the sets of blend shapes in the sequence and in order of increasing priority, the one or more blend shape identifiers in the set are added to a set of blend shapes for the entity. Dependent upon whether a blend shape identifier that is added is already present in that set, the parameters for the blend shape are either added or updated. One or more blend shapes from the set of blend shapes for the entity are then added to a mesh of the entity using a randomization method and the resultant mesh is stored in memory.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, a three-dimensional character may be generated by applying one or more blend shapes to a base mesh for the character and in order to generate different characters (i.e. characters with different appearances) automatically, random numbers may be used. However, as more than one blend shape can affect the shape and size of the same part of the base mesh, use of random numbers to calculate blend weights can result in discontinuities, folds or other abrupt changes in direction in the resultant mesh for the character (e.g. where the changes to the mesh as a consequence of the combination of blend shapes and/or blend weights used being incompatible). Use of random numbers can as a result, generate a character with a grotesque combination of features.

Described herein is a system and method of automatically generating a three-dimensional computer generated entity, such as a character, that can subsequently be rendered and displayed on screen within a graphical user interface (GUI). The methods described herein enable the generation of multiple different three-dimensional entities (e.g. characters) without manual intervention (e.g. other than to trigger the generation process) and ensure that the resultant mesh of the entity (e.g. the character mesh) does not include any discontinuities, folds or other abrupt changes in direction. The generation of the entities by generating a candidate set of blend shapes (and accompanying blend parameters) and applying one or more blend shapes is performed as part of a set-up operation (e.g. such that the application of the blend shapes is baked into the mesh of the character) rather than during the animation of an entity (e.g. a character) and this reduces the peak processing load (i.e. the amount of computation performed at run-time is reduced). Furthermore, the data used to generate a three-dimensional entity according to the methods described herein is stored in a compact manner (thereby reducing memory requirements) and can be updated easily, e.g. if a new blend shape or entity type is added. Use of the methods described herein also avoids the possibility of generating grotesque characters (e.g. which may then need to be discarded and a new character generated, thereby wasting processing power) and instead enables generation of a wide variety of visually pleasing, yet diverse, characters.

Figure 1:
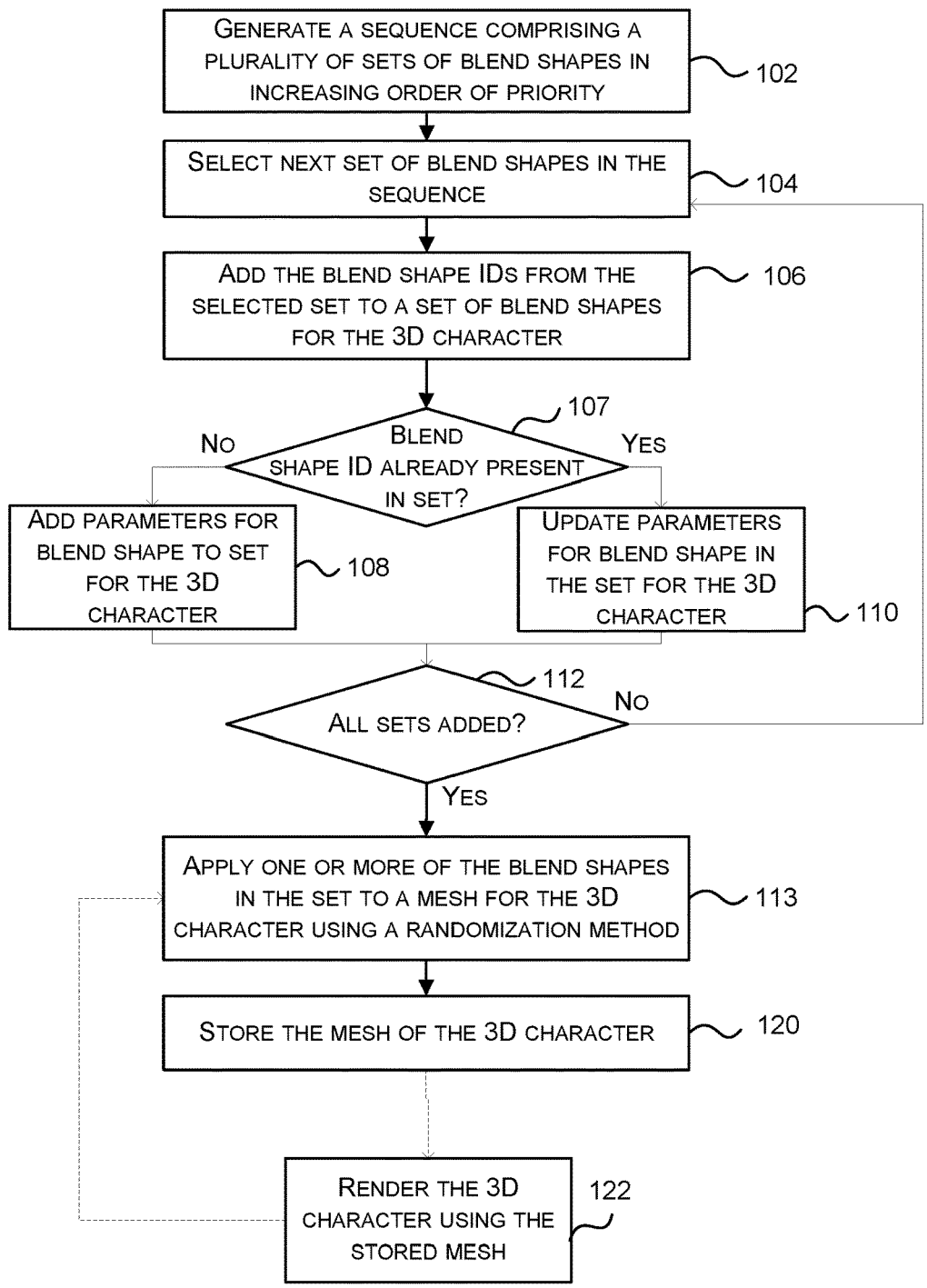
FIG. 1 is a flow diagram of an example method of automatically generating a three-dimensional computer generated entity.
Figure 2:
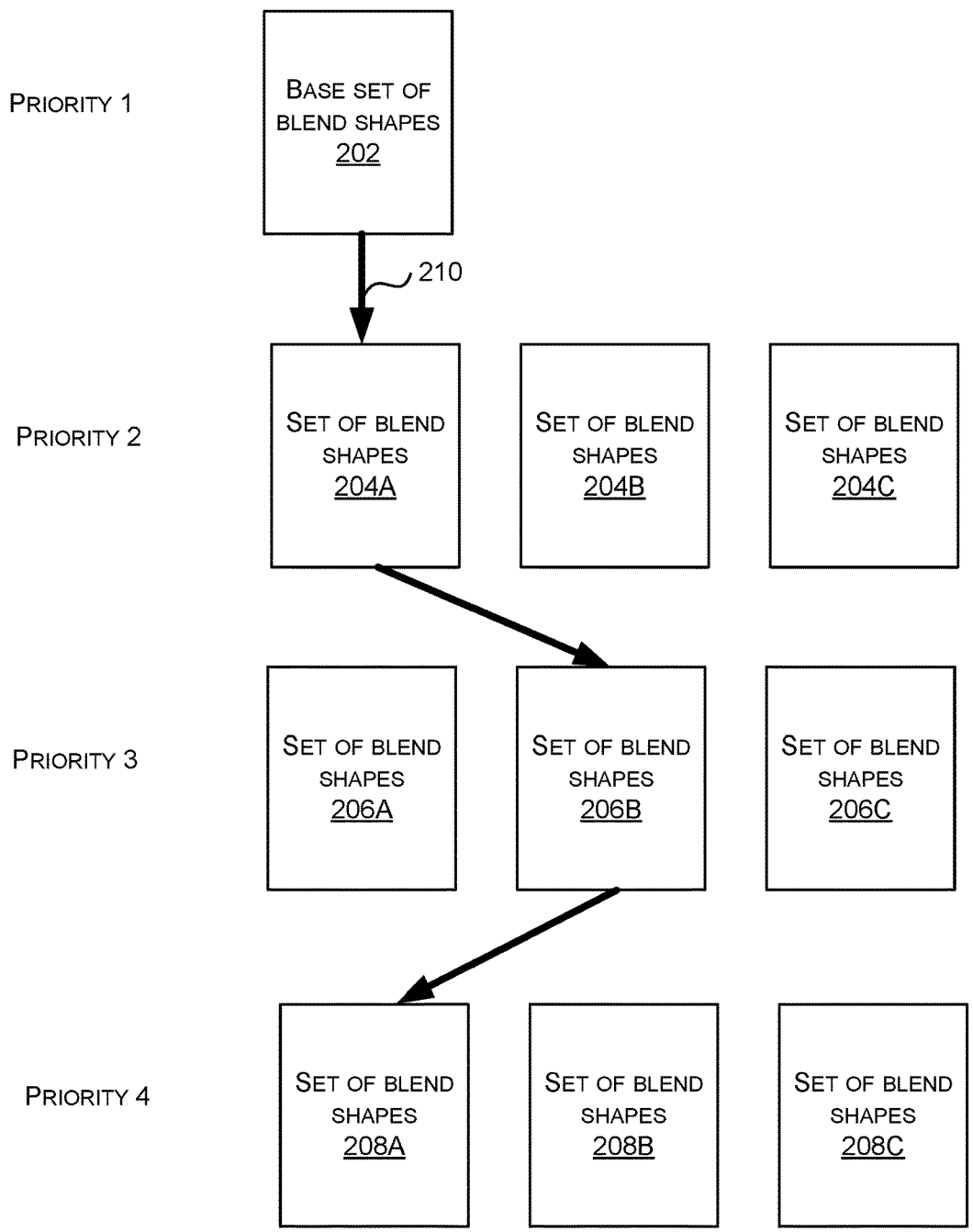
FIG. 2 is a graphical representation of a part of the method of FIG. 1.
Figure 3:
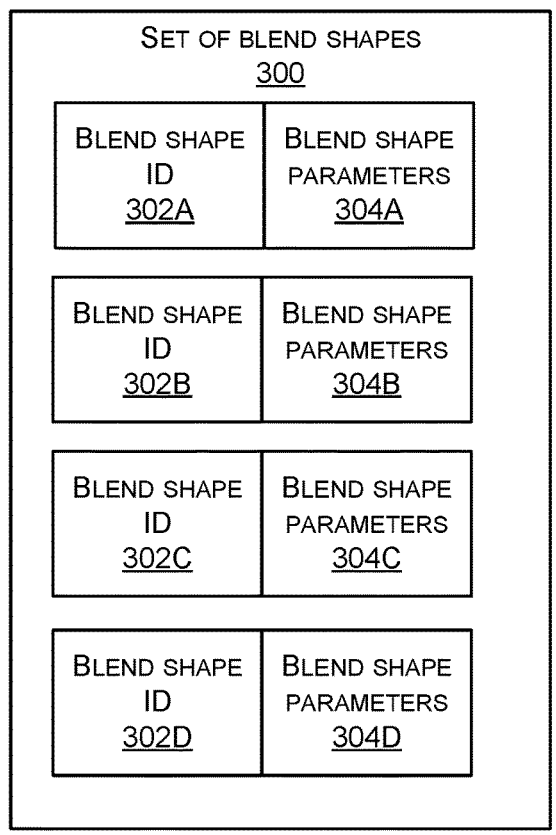
FIG. 3 is a graphical representation of a part of the method of FIG. 1.
Figure 4:
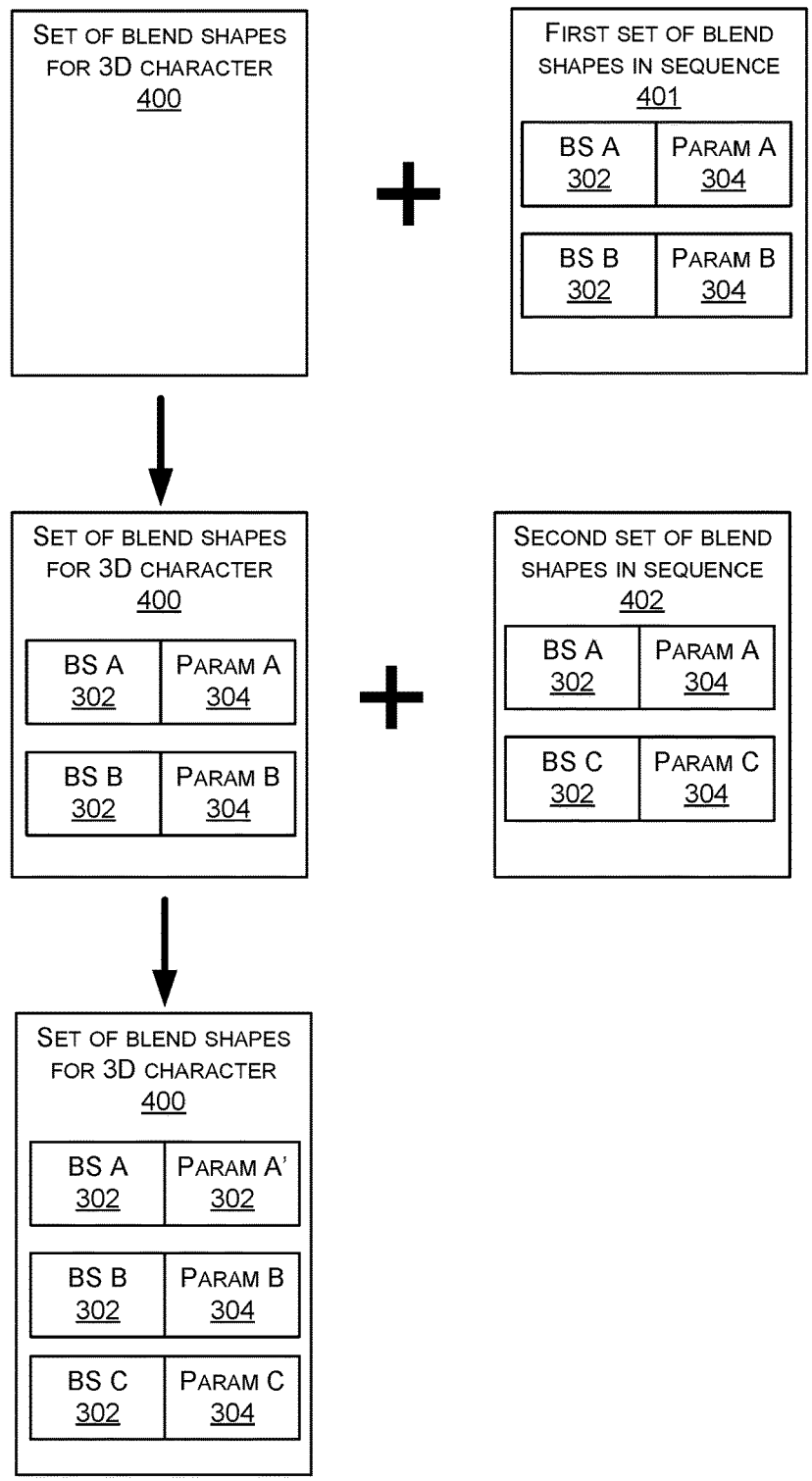
FIG. 4 is a graphical representation of a part of the method of FIG. 1.

FIG. 1 is a flow diagram of an example method of automatically generating a three-dimensional computer generated entity and FIGS. 2-4 show graphical representations of parts of this method. For the purpose of the following description, the entity is a character; however, it will be appreciated that the methods described herein may also be used for other types of entities (e.g. an inanimate object, a plant, etc.). As shown in FIG. 1, the method comprises generating a sequence comprising two or more sets of blend shapes in order of increasing priority (block 102). As shown in FIG. 2, the sequence is selected by selecting a set of blend shapes 202 at the lowest priority level (labeled 'priority 1' in FIG. 2), then a set of blend shapes from those sets of blend shapes 204A-C at the next lowest priority level (labeled 'priority 2' in FIG. 2), then a set of blend shapes from those sets of blend shapes 206A-C at the next lowest priority level (labeled 'priority 3' in FIG. 2) and finally a set of blend shapes from those sets of blend shapes 208A-C at the highest priority level (labeled 'priority 4' in FIG. 2). The sequence of sets of blend shapes that have been selected in the example of FIG. 2 is shown by the bold line 210 that connects the selected sets.

The selection of a set of blend shapes at any level of priority may be performed randomly (i.e. a random selection of one of the set of blend shapes at that particular priority) or based on any other criteria. Although FIG. 2 shows only four different priority levels and, aside from the lowest level, three possible sets to select from at each priority level, there may be more or fewer priority levels and more or fewer possible sets to select from at each different priority level. At least one of the priority levels (and in various examples, at least two of the priority levels), comprises a plurality of different sets of blend shapes. Furthermore, although FIG. 2 shows the selection of a single set at each priority level, in various examples, more than one set may be selected from a particular priority level (as described below) or no set may be selected from one or more priority levels, e.g. one set may be selected from each of priority levels 1, 2 and 4 and no set may be selected from priority level 3.

Each of the sets of blend shapes corresponds to a characteristic of the character, such as their gender, ethnicity, age, behavior, etc. and the different priority levels (which may also be referred to as groups of sets of blend shapes) may comprise sets of blend shapes which represent different variants for the same characteristic. For example, the second lowest priority level (priority 2 in FIG. 2) may comprise two sets of blend shapes relating to gender, i.e. one set for a male character and one set for a female character. Furthermore, the next lowest priority level (priority 3 in FIG. 2) may comprise a plurality of sets of blend shapes 206A-C relating to different ethnicities, or alternatively, ethnicity and gender may be combined in the second lowest priority level (priority 2) such that it comprises pairs of sets of blend shapes for each of two or more different ethnicities, each pair comprising one set of blend shapes for a male character of the particular ethnicity and one set of blend shapes for a female character of the particular ethnicity. In various examples, one of the priority levels may comprise a plurality of different sets of blend shapes corresponding to different ages (e.g. different sets of blend shapes for each of 30, 40, 50 and 60 year old characters).

As shown in FIG. 3, each set of blend shapes 202A-C, 206A-C, 208A-C, 300 (irrespective of its priority level or the characteristic to which it relates) comprises identifiers (IDs) for one or more blend shapes 302A-D (e.g. in the form of a reference to a blend shape that is stored in a central library of blend shapes) and for each blend shape, one or more parameters 304A-D defining candidate blend weights for the blend shape and/or other information relating to the application of the blend shape to a 3D character. The parameters 304A-D may, for example, comprise either:

a minimum and maximum value for the blend weight for the blend shape; or an envelope value which dampens the minimum and maximum values already stored in the set of blend shapes for the 3D character (i.e. as a consequence of being added by lower priority sets)

And also may include:

compatibility criteria for the blend shape in relation to other, lower priority sets of blend shapes.

Having generated the sequence (in block 102), sets of blend shapes in the sequence are selected (in block 104) in turn in order of increasing priority (i.e. starting with the set with the lowest priority, e.g. priority 1) and the blend shape IDs 302A-D from the selected set are added to a set of blend shapes for the character (block 106), which initially (i.e. prior to the addition of the first set of blend shapes in the sequence) is empty. If, when adding a blend shape ID from a selected set in the sequence, the blend shape ID is not already present in the set of blend shapes for the 3D character ('No' in block 107), the parameters for the blend shape from the selected set are also added to the set of blend shapes for the 3D character (block 108). However, if when adding a blend shape ID from a selected set in the sequence, the blend shape ID is already present in the set of blend shapes for the 3D character ('Yes' in block 107), the parameters for the blend shape in the selected set are used to update the parameters for the blend shape in the set for the 3D character (block 110).

This adding or updating of parameters (in blocks 107-110) is shown graphically in FIG. 4. Initially the set of blend shapes for the 3D character 400 is empty (i.e. it does not comprise any blend shape IDs or associated parameters). A first set in the sequence 401 is then added and as there are no blend shape IDs already in the set for the 3D character, all the blend shape IDs and their parameters (blend shapes A and B in the example shown) can be added into the set of blend shapes for the 3D character (in blocks 106 and 108). However, when the second set of blend shapes in the sequence 402 is added, one blend shape ID to be added is not the same as any of the blend shape IDs already in the set of blend shapes for the 3D character (blend shape C in the example shown) and the other is the same as an existing blend shape ID (blend shape A in the example shown). Consequently, when adding the parameters for this overlapping blend shape ID (blend shape A), the parameters for the blend shape from the set that is being added are used to update the parameters (param A) which are already stored in the set of blend shapes for the 3D character (to generate updated parameters for blend shape A, denoted param A').

The updating of parameters (in block 110) may comprise overwriting the already stored parameters for the blend shape in the set of blend shapes for the 3D character (e.g.

where the parameters for the blend shape in the higher priority set are max and min values) or reducing the already stored parameters (e.g. where the parameters for the blend shape in the higher priority set are an envelope value and so the already stored max and min values are updated by multiplying them by the envelope value). In the examples where the parameters for the blend shape in the higher priority set comprise compatibility criteria in addition to either max and min values or an envelope value, the already stored parameters in the set of blend shapes for the 3D character are only updated (in block 110) if the compatibility criteria are satisfied. For example, the compatibility criteria may specify that the blend shape in the higher priority set is only compatible with the 'female' set of blend shapes. Consequently, if the 'female' set of blend shapes has previously been added (because that set was a lower priority set in the generated sequence of sets), then the already stored parameters for the blend shape in the set of blend shapes for the 3D character are updated (in block 110) based on the parameters for the blend shape in the higher priority set. However, if the 'female' set of blend shapes has not previously been added, then the already stored parameters for the blend shape in the set of blend shapes for the 3D character are not updated.

Figure 7A:
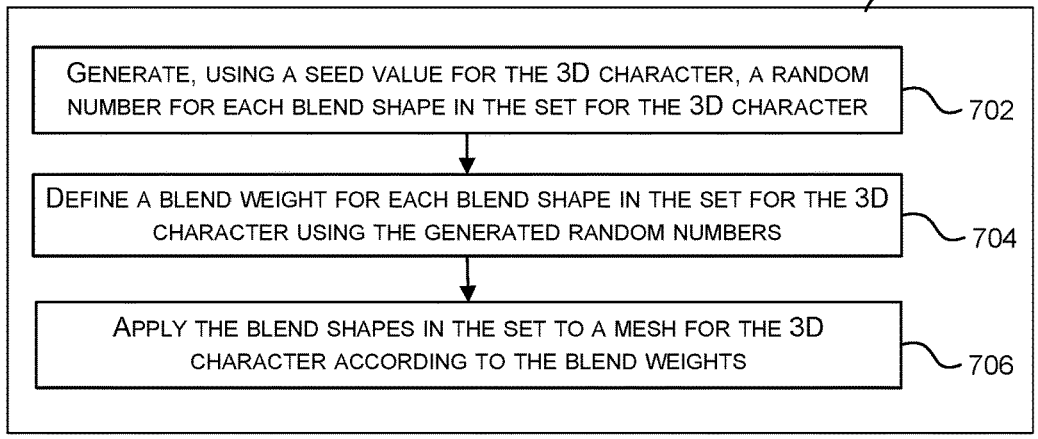
FIGS. 7A, 7B and 7C show a part of the method of FIG. 1 in more detail.
Figure 7B:
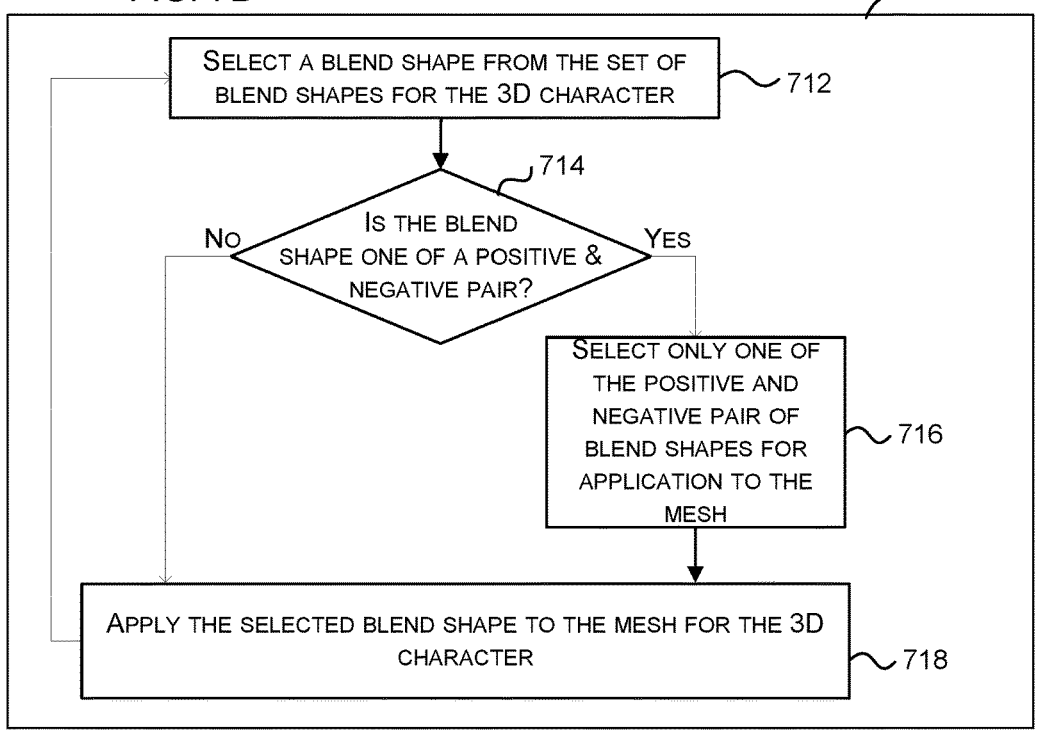
Figure 7C:
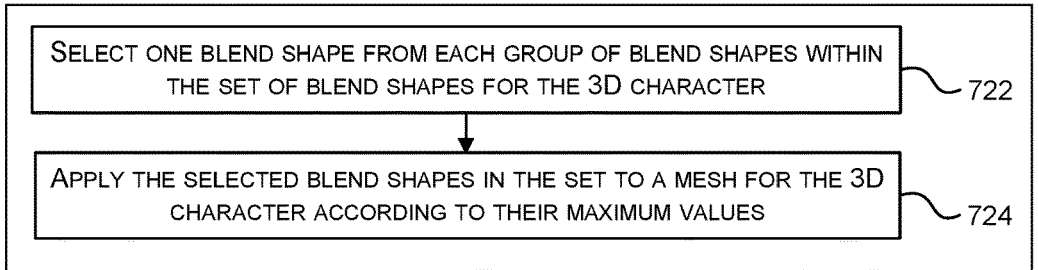

Once all the sets in the sequence have been added ('Yes' in block 112), the set of blend shapes for the 3D character is complete and this may be stored. One or more of the blend shapes identified in the set for the 3D character are then applied to a mesh of the character using a randomization method (block 113) and the resultant mesh of the character is stored (block 120). Various different randomization methods may be used to determine which of the blend shapes are applied and the degree to which they are applied (in block 113) and three different examples are described below with reference to FIGS. 7A-C. These three example randomization methods described with reference to FIG. 7A-C may be used on their own or in combination with one or more other randomization methods (e.g. others of those described below or other methods).

As shown in FIG. 1, the stored mesh for the 3D character may be subsequently used to render the 3D character (block 122) so that it can be displayed within a GUI (e.g. as part of a computer animation or game) and in various examples, the mesh may be used to animate the 3D character in real-time.

Using the method described above, the modifications to the mesh as a consequence of the various blend shapes that are applied are stored as a finalized mesh (in block 120) which can then be used when rendering (and optionally animating) the character (e.g. in a computer animation or computer game). This process may be referred to as 'baking the blend shapes into the base mesh of the character'. By applying the blend shapes up front in this way (e.g. separate from performing any animation), the processing power (i.e. the amount of computation) required at run-time is reduced. In addition, the method may also be used at specific points during runtime (e.g. during gameplay) to show visually the character blending between sets (e.g. to visually show the ageing of a character).

Figure 5:
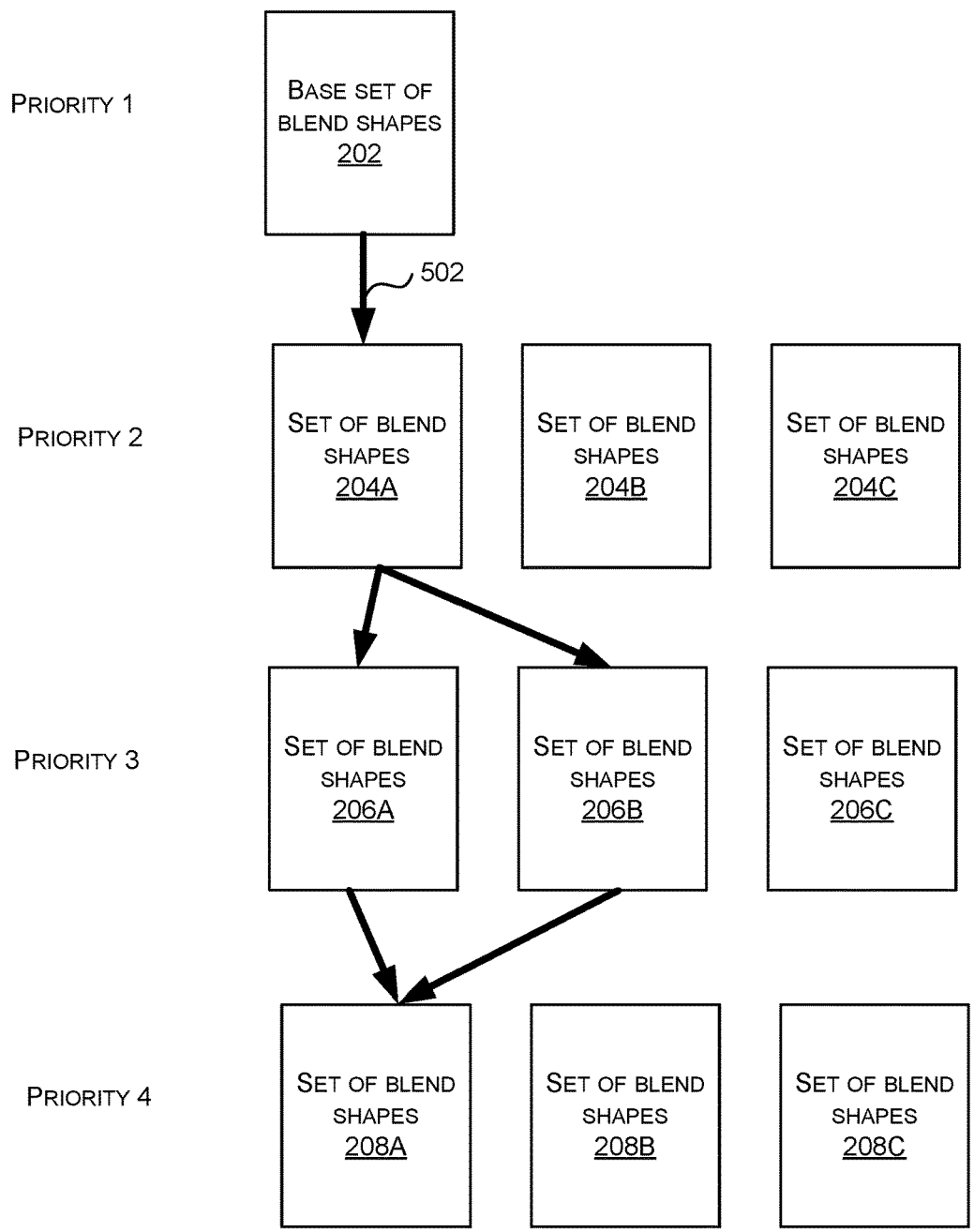
FIG. 5 is a graphical representation of a part of the method of FIG. 1 which is a variation of that shown in FIG. 2.

In the example described above with reference to FIG. 2, only a single set of blend shapes is selected at each level of priority (e.g. a base set 202 at priority 1, one set 204A at priority 2, one set 206B at priority 3 and one set 208A at priority 4). In various examples, however, two sets of blend shapes can be selected from a single priority level, as represented graphically in FIG. 5. Unlike in FIG. 2, in FIG. 5, two sets of blend shapes 206A, 206B are selected from those sets of blend shapes 206A-C at the third lowest priority level (priority 3) as shown by the bold line 502 that connects the selected sets. In examples where two sets of blend shapes are selected within a single priority level, the first half of the method of FIG. 1 is modified, as shown in FIG. 6 but the second half of the method of FIG. 1 (i.e. block 113 onwards) is unchanged.

Figure 6:
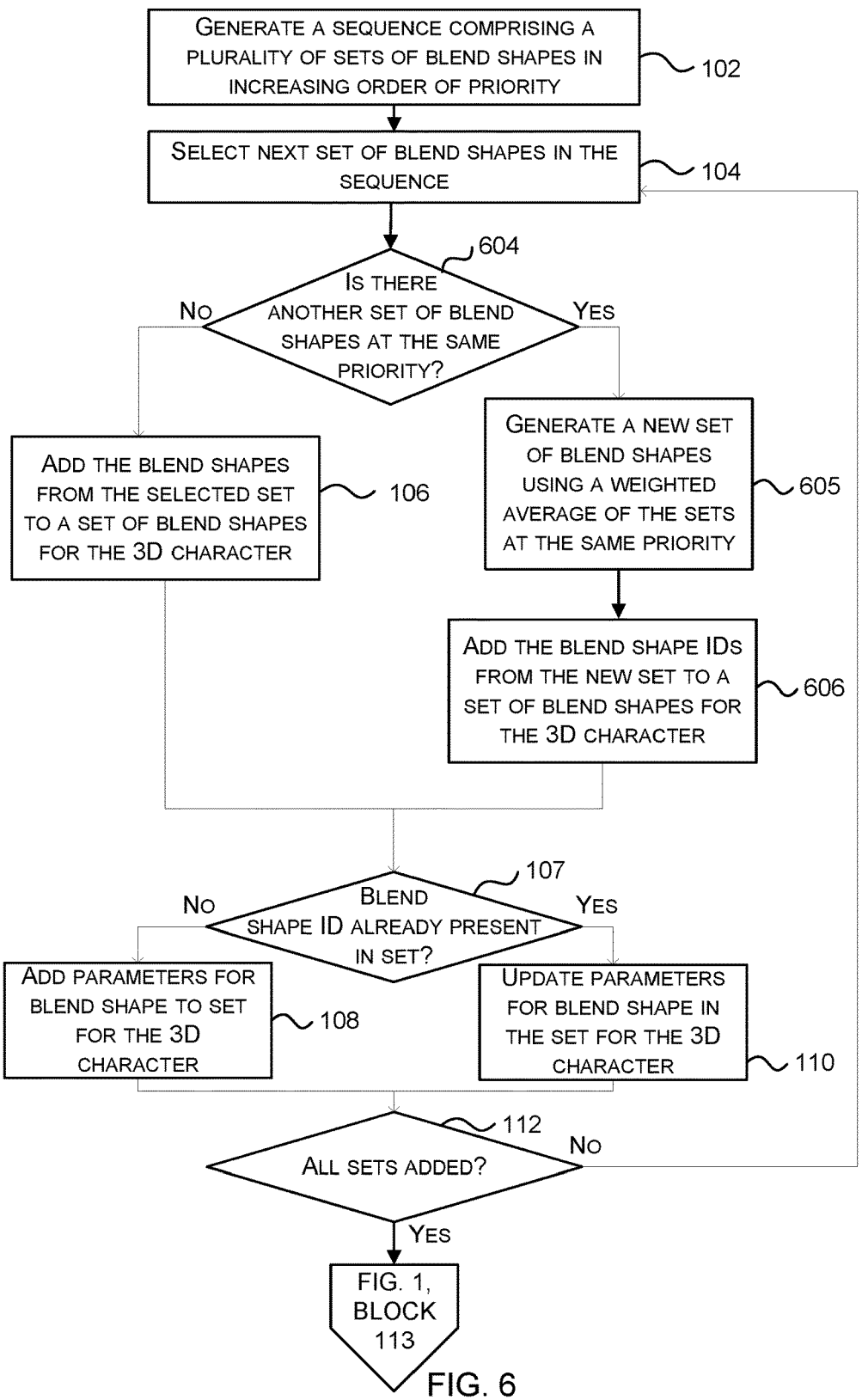
FIG. 6 is a flow diagram of another example method of automatically generating a three-dimensional computer generated character.

As shown in FIG. 6, having generated a sequence comprising a plurality of sets (in block 102), where in this case there are at least two sets in the sequence which are at the same priority, sets of blend shapes in the sequence are selected (in block 104) in turn in order of increasing priority (i.e. starting with the set with the lowest priority, e.g. priority 1). If the selected set of blend shapes (as selected in block 104) is the only blend shape at that priority ('No' in block 604), the method continues as described above with reference to FIG. 2. However, if there is another set of blend shape in the sequence at the same priority ('Yes' in block 604), a new set of blend shapes is generated using a weighted average of those sets in the sequence which are at the same priority (block 605) e.g. a weighted average of the two sets 206A, 206B at priority 3, in the example of FIG. 5. The weight that is used (in block 605) may be a random number which is generated or may be determined in any other way. The resultant new set of blend shapes (as generated in block 605) comprises the blend shape IDs from all (e.g. both) of the sets at the same priority and the blend parameters are a weighted average of the corresponding blend weights in each of the sets at the same priority.

Having generated the new set of blend shapes (in block 605), the blend shape IDs from the new set are added to the set of blend shapes for the 3D character (block 606). If, when adding a blend shape ID from a new set in the sequence, the blend shape ID is not already present in the set of blend shapes for the 3D character ('No' in block 107), the parameters for the blend shape from the new set are also added to the set of blend shapes for the 3D character (block 108). However, if when adding a blend shape ID from the new set, the blend shape ID is already present in the set of blend shapes for the 3D character ('Yes' in block 107), the parameters for the blend shape in the new set are used to update the parameters for the blend shape in the set for the character (block 110).

By enabling the combining of two sets of blend shapes at the same priority, it reduces the overall number of sets of blend shapes that need to be stored and hence reduces memory requirements. For example, if the three sets of blend shapes 206A-C at priority 3 in FIG. 5 correspond to different ages of character, e.g. 30 years, 40 years and 50 years, sets of blend shapes for intermediate ages can be generated (in block 605) using the method of FIG. 6 and do not need to be provided as candidate sets for selection. Furthermore, it is possible to visually show the blending of these characteristics at runtime (e.g. to show a live animation of a character ageing).

As described above, various different randomization methods may be used to determine which of the blend shapes are applied and the degree to which they are applied (in block 113). Three different methods can be described with reference to FIG. 7A-C.

In a first example method (block 113A, shown in FIG. 7A), a seed value for the 3D character is identified and then used to generate a random number for each blend shape in the set of blend shapes for the character (block 702). The seed value may, for example, be a random integer value which is generated (e.g. by sampling from the current time) or the seed value may be a value which is manually input by a user. In various examples a separate random number may be generated for each of the blend shapes in the set of blend shapes for the 3D character. In other examples, however, a single random number may be generated for a group of blend shapes (which may be referred to as a 'blend node') and that single random number may be used as the random number for each blend shape in the blend node. In various examples the random numbers which are generated (in block 702) may be in the range of zero to one.

A blend weight for each blend shape in the set of blend shapes for the character is then determined by mapping the random number for a blend shape into a range of candidate blend weights defined by the parameters for the blend shape in the set blend shapes for the character (block 704). In various examples, if the random number for the blend shape is denoted r and the range of candidate blend weights is between a minimum blend weight, $W_{min}$, and a maximum blend weight, $W_{max}$, the blend weight, W, may be determined as follows:

$$W = W_{min} + r \cdot (W_{max} - W_{min})$$

In other examples the mapping may comprise setting the blend weight equal to the random number if it is within the range defined by the parameters for the blend shape or capping at one of the extremes of the range, i.e:

If $r \leq W_{min}$, $W = W_{min}$
If $r \geq W_{max}$, $W = W_{max}$
Else W=r

Having determined a blend weight for each blend shape in the set of blend shapes for the 3D character (in block 704), one or more of the blend shapes are applied to a mesh of the character according to the defined blend weight for the blend shape (block 706).

In the first example (block 113A, shown in FIG. 7A), all the blend shapes in the set for the 3D character are applied to the mesh (in block 706). In other examples, however, not all the blend shapes in the set for the 3D character may be applied (in block 113) as in the other two randomization methods shown in FIGS. 7B and 7C. In the second example (block 113B, shown in FIG. 7B), there may be positive and negative pairs of blend shapes (which may be referred to as pairs of complementary blend shapes), with the two blend shapes in the pair applying an inverse effect on a body part (e.g. such that one makes a character's nose larger and the other makes the character's nose smaller) and only one of the two blend shapes in a positive/negative pair is applied to the mesh for the 3D character. The set of blend shapes for the 3D character may comprise neither, one or both of the blend shapes from such a positive/negative pair. In such examples, when applying blend shapes to the mesh (in block 113B), a blend shape is selected from the set of blend shapes for the 3D character (block 712) and if this blend shape is not part of a positive/negative pair within the set of blend shapes for the 3D character ('No' in block 714), the selected blend shape is applied to the mesh for the 3D character according to the blend weight for the selected blend shape (block 718). However, if the selected blend shape is part of a positive/negative pair within the set of blend shapes for the 3D character ('Yes' in block 714), then only one of the positive/negative pair is selected (block 716) and then added to the mesh for the 3D character (block 718). The other of the positive/negative pair is not added to the mesh for the 3D character.

Figure 8:
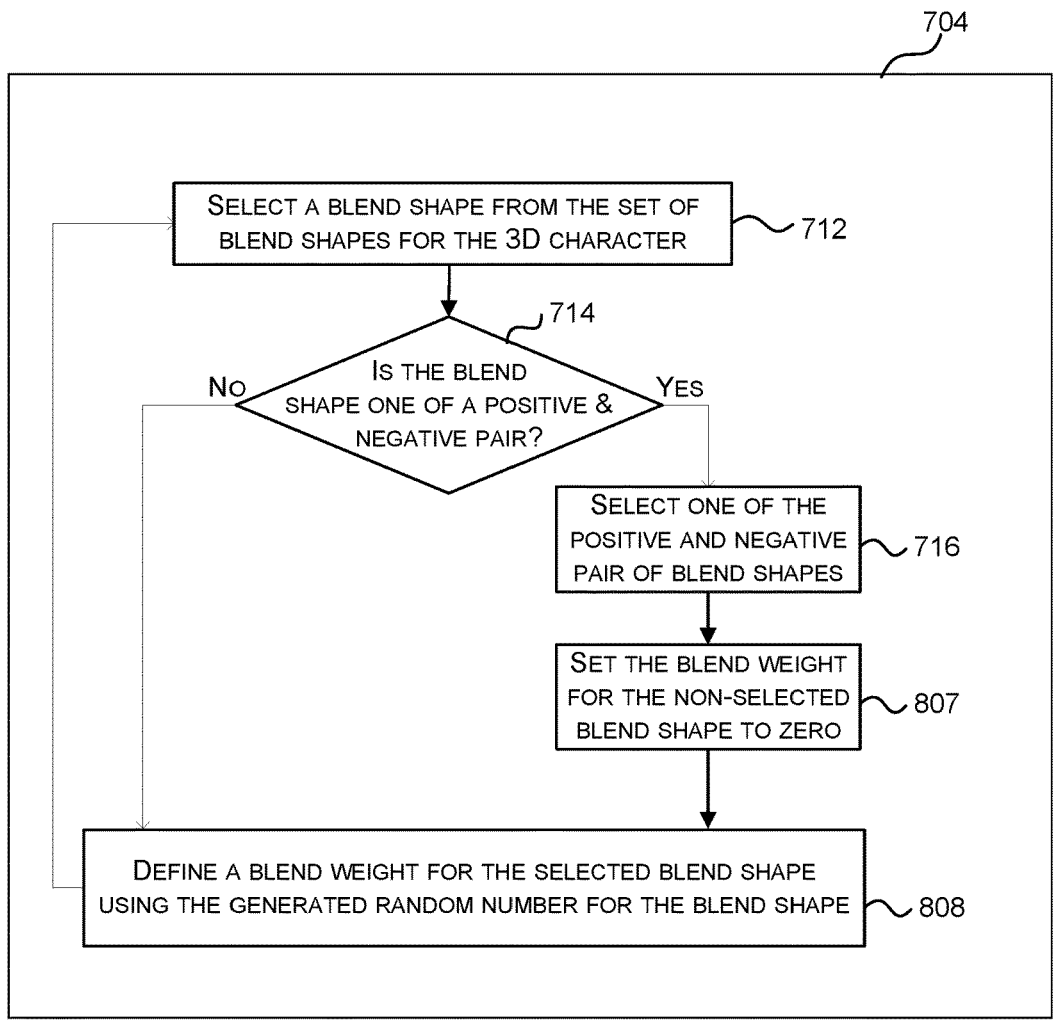
FIG. 8 shows a part of the method of FIG. 7A in more detail.

Instead of implementing the check for a positive/negative pair at the point when the blend shapes are applied to the mesh (in block 714) as shown in the second example (in block 113B in FIG. 7B), in other examples, the same effect may be achieved by modifying the first example, as shown in FIG. 8. For example, when defining the blend weights (in block 704), a blend shape is selected from the set of blend shapes for the 3D character (block 712) and if this blend shape is not part of a positive/negative pair within the set of blend shapes for the 3D character ('No' in block 714), a blend weight for the selected blend shape is defined using the random number generated for the blend shape (block 808). However, if the selected blend shape is part of a positive/negative pair within the set of blend shapes for the 3D character ('Yes' in block 714), then one of the positive/negative pair is selected (block 716), the blend weight for the other of the positive/negative pair is set to zero (block 807) and a blend weight for the selected blend shape is defined using the random number generated for the blend shape (block 808).

In a third example (block 113C, shown in FIG. 7C), one blend shape is selected from each group of blend shapes within the set of blend shapes for the 3D character (block 722), e.g. selected at random, and those selected blend shapes are applied to the mesh for the 3D character using blend weights set to the maximum values for each of the selected blend shapes (block 724). This may alternatively be described as setting the blend weights for all the selected blend shapes to their maximum values and the blend weights for all other blend shapes in the set of blend shapes for the 3D character to zero and then applying all the blend shapes in the same group to the mesh of the 3D character.

Although the methods of FIGS. 1 and 6 are described as generating a single character, in various examples the second half of the method (i.e. block 113 onwards) may be modified (e.g. as indicated by the dotted arrow from block 122 to block 113) to enable multiple 3D characters to be generated from a single set of blend shapes for a 3D character generated using the first half of the method (i.e. up to block 112 of FIG. 1 or 6).

In various examples where a seed is used to generate random numbers which are used in the application of the blend shapes (in block 113, e.g. as in block 113A), the seed value may be generated in response to receiving a user input. This seed value is then used to generate and render the 3D character as described above. In response to another user input, a different seed may be generated and used to generate a different 3D character using the methods described above. In this way the methods described above may be repeated to generate a plurality of different 3D characters from the same set of blend shapes for a character e.g. using different seeds (generated in block 702). This provides a computationally efficient method of generating a plurality of 3D characters (e.g. as the same set of blend shapes for the character is used each time and does not require a new set of blend shapes to be generated). Furthermore, by reusing the same set of blend shapes for the character, each of the plurality of characters which are generated (using different seeds) will possess the same generalized characteristics.

By using the methods described above to generate a three-dimensional character, the results are deterministic and predictable. This improves consistency in the event that the blend shapes used in the system are edited or updated in any way.

The methods described above may be used to generate an initial 3D character and this character may then not change in appearance over time. In other examples, however, the 3D character may be regenerated subsequently (e.g. to artificially age the character). This regeneration may be implemented by repeating the first half of the methods of FIG. 1 or 6 to generate a new set of blend shapes for the 3D character (e.g. blocks 102-112 from FIG. 1 or blocks 102-

112 and 604-606 in FIG. 6) and then using the same randomization method (e.g. the same seed value and random numbers as generated in a previous iteration of block 113A) to apply the blend shapes (in block 113), store the new version of the mesh (in block 120) and render the updated version of the 3D character (in block 122). When repeating the first half of the methods of FIG. 1 or 6, a new sequence of sets of blend shapes may be generated (in block 102) and it is this new selection that results in the change in appearance of the 3D character when deformed (in block 122). In other examples, the sequence may not change, but a different weighted average may be used (in block 605) when combining two sets of blend shapes from the sequence which are at the same priority.

In various examples, the set of blend shapes for the 3D character which is generated using the methods described above may relate to only a part of the 3D character and hence to only a part of the mesh of the 3D character (e.g. the character's head and face). In various examples, other blend shapes may additionally be added to the mesh prior to rendering (in block 122) and either before or after the application of the blend shapes from the generated set of blend shapes for the 3D character (in block 113).

Figure 9:
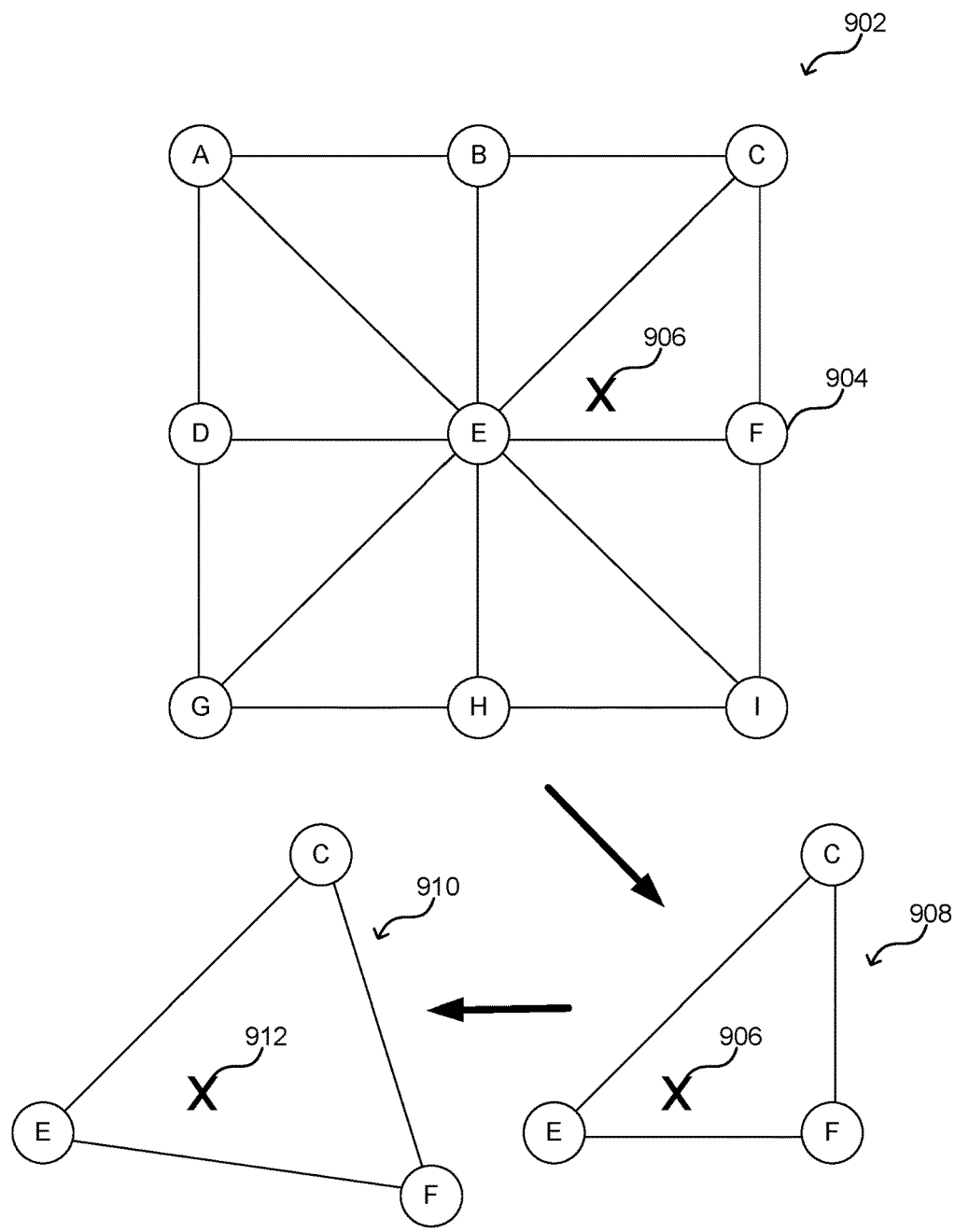
FIG. 9 is a graphical representation of an example method of selecting blend shapes which may be used in combination with, or separately from, the method of FIG. 1 or 6.

In various examples, a weighted average of three further blend shapes (e.g. which affect the entire body or a different part of the body from the blend shapes in the set of blend shapes for the 3D character) may be applied to the mesh of the 3D character (prior to block 122 and either before or after block 113) where the three blend shapes and the blend weights may be determined using a randomization method that can be described with reference to FIG. 9. FIG. 9 shows an arrangement 902 of 9 blend shapes, denoted A-I, arranged in a grid. By selecting, at random, a position within the arrangement 902, e.g. in the form of an x,y coordinate (e.g. at the position 906 marked by an X in FIG. 9), three of the blend shapes are identified (e.g. blend shapes C, E and F in the example shown) and these may be applied with blend weights calculated by remapping the triangle 908 containing the x,y coordinate so that it is an equilateral triangle 910 and then calculating blend weights based on the distance of the selected position 912 in the remapped space from each of the vertices of the remapped triangle 910 (e.g. such that the blend weight is inversely proportional to the distance from the vertex corresponding to a particular blend shape in the remapped triangle 910).

The application of the further blend shapes according to the method described above with reference to FIG. 9 may be independent of the method described earlier to generate a set of blend shapes for the 3D character (e.g. as shown in FIGS. 1 and 6). In other examples, there may be multiple arrangements of 9 (or more) blend shapes in a grid and the arrangement used may be selected dependent upon the presence or absence of a particular set of blend shapes in the generated sequence (from block 102). For example, there may be a first arrangement for male characters and a second arrangement for female characters with the two grids being the same but comprising different body shapes at each node in the grid.

In various examples, the method described above with reference to FIG. 9 may be used as an alternative randomization technique (in block 113) to apply two or more of the blend shapes in the set of blend shapes for the 3D character to the mesh for the 3D character. In such examples the nodes 904 in the grid 902 correspond to different blend shapes in the set of blend shapes for the 3D character and three of these blend shapes are selected and applied by selecting a position within the grid 902 at random and generating three blend weights as described above.

The method described above with reference to FIG. 9 may be used at set-up to generate an initial character and may also be used at runtime (e.g. during gameplay) to modify the character. For example, in response to user input (or other aspects of gameplay, where the character is part of a computer game), the initial coordinate 906 may be moved within the grid 902 (e.g. in response to the character running a lot, a small value may be subtracted from the y-coordinate or in response to the character eating a lot within the virtual world, a small value may be added to the y-coordinate) and new blend weights generated from the updated position using the method described above. Having generated new blend weights, the mesh of the character is modified by changing how the particular blend shapes are applied to the mesh of the character.

The method described above with reference to FIG. 9 provides a very flexible and adaptable method of determining blend weights which can be systematically updated, e.g. in response to user input or other events.

In the methods described above, one or more blend shapes are applied to a mesh for a 3D character and some degree of randomization (e.g. random number generation) is used to determine which blend shapes are applied and/or the extent to which they are applied (e.g. by determining the values of the corresponding blend weights). The mesh that is used may be generated using any suitable method and one example method for generating a mesh of a 3D character is described below with reference to FIG. 10. This method may be used in combination with any one or more of the methods described above or may be used independently of the methods described above.

Figure 10:
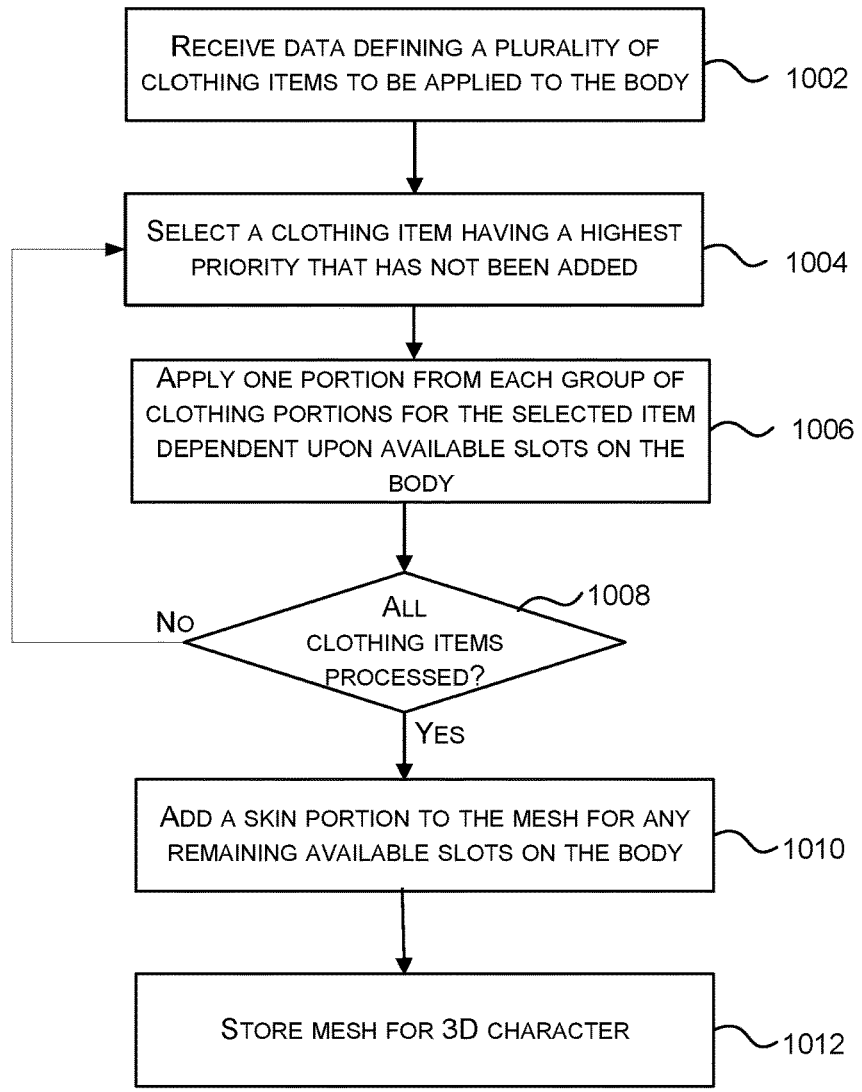
FIG. 10 is a flow diagram of an example method of automatically generating a mesh for a three-dimensional computer generated character.

The method shown in FIG. 10 divides the body of the 3D character into a plurality of slots (e.g. hands, lower arms, upper arms, torso, etc.). Portions of a body mesh corresponding to items of clothing (e.g. gloves, shirts, trousers) are stored in a hierarchy with different clothing categories (e.g. gloves, shirts, trousers) having different associated priorities and in various examples, clothing categories which are applied at the end of a limb (e.g. gloves and shoes) having a higher priority than clothing categories that are applied closer to the center of the body (e.g. on the upper arms, torso, etc.). There may be many clothing items in the same category (e.g. multiple different shirts) and any particular clothing item may comprise one or more groups of component parts, where each component part overlaps at least one slot on the body. A group of component parts comprises component parts that overlap a common slot on the body (e.g. a first group may comprise two left sleeve parts, both of which cover the left upper arm slot and one of which covers the left lower arm slot, a second group may comprise two right sleeve parts, etc.). Each component part defines the shape (and optionally other parameters such as color) of the body mesh for the slots of the body that it overlaps.

As with the blend shapes, by using a hierarchical structure of clothing items visual discontinuities in the rendered character can be avoided (e.g. where two incompatible items of clothing are added to the mesh), such that there are no overlapping surfaces in the mesh and no holes. Furthermore the overall number of computations required to render the 3D character can be reduced (e.g. because parts of the clothing which cannot be seen are not rendered, e.g. the portion of a shirt sleeve which is hidden by a glove is not rendered). In addition, the user can select clothing items as a high level part and they do not need to worry about whether parts overlap or leave gaps as this is handled automatically by the method of FIG. 10.

As shown in FIG. 10, the method comprises receiving data defining a plurality of clothing items to be applied to the body (block 1002), where this data may be generated in response to user inputs. A first clothing item with a highest priority is selected from the plurality of clothing items (block 1004) and one portion from each group of clothing portions for the selected item is added to the mesh of the 3D character dependent upon the available slots on the body (block 1006). In particular, where there are multiple portions in a group for a particular clothing item, the portion that covers as many available slots on the body is selected and added (in block 1006). A slot on the body is considered to be available if a clothing portion which overlaps that portion has not already been added to the body mesh (e.g. in a previous iteration of block 1006). The selection of clothing items and addition of clothing portions to the body mesh (in blocks 1004 and 1006) is then repeated until all the clothing items in the plurality of clothing items (as defined in the data received in block 1002) have been processed ('Yes' in block 1008), e.g. all clothing items have been added.

For example, if the first clothing item that is selected is a particular shirt which comprises a group of left sleeve portions, a group of right sleeve portions and a group comprising a single torso portion, the single torso portion is added, and the left sleeve portion and right sleeve portion that each overlap the most available body slots are selected (e.g. a long-sleeved variant for both the left and right sleeves). If however, the first clothing item that is selected is a pair of gloves, when the shirt is subsequently selected (in a second iteration of the loop comprising blocks 1004-1006), the left and right lower arm slots are no longer available and so the long-sleeved variants (which cover two slots) will not be selected and instead the short-sleeved variants (which cover one slot) will be selected and added (in block 1006).

Once all the clothing items have been added ('Yes' in block 1008), a skin portion is added to the mesh of the 3D character for all remaining available slots (block 1010) to complete the 3D mesh, before storing the mesh (block 1012). In this way, the mesh which is generated (and then stored in block 1012) comprises a portion corresponding to each slot, where for any slot this may be a clothing portion (as added in block 1006) or a skin portion (as added in block 1010). This mesh may then be used as an input to the blend shape methods described above.

Figure 11:
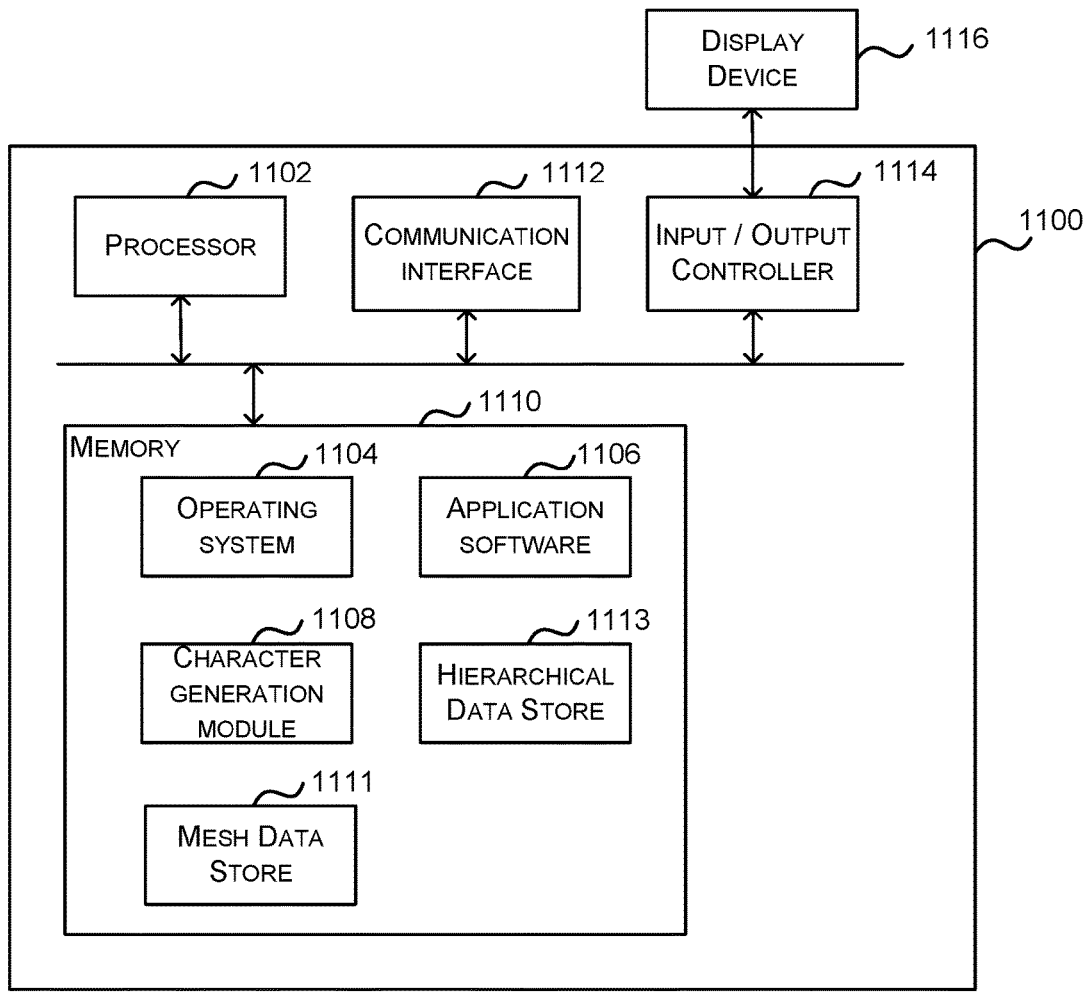
FIG. 11 illustrates an exemplary computing-based device in which embodiments of the methods described herein are implemented.

FIG. 11 illustrates various components of an exemplary computing-based device 1100 which is implemented as any form of a computing and/or electronic device, and in which embodiments of the methods described herein may be implemented.

Computing-based device 1100 comprises one or more processors 1102 which are microprocessors, controllers or any other suitable type of processors for processing computer executable instructions to control the operation of the device in order to generate or modify a mesh for a 3D character using any of the methods described above. In some examples, for example where a system on a chip architecture is used, the processors 902 include one or more fixed function blocks (also referred to as accelerators) which implement a part of the method of generating or modifying the mesh in hardware (rather than software or firmware).

Platform software comprising an operating system 1104 or any other suitable platform software is provided at the computing-based device 1100 to enable application software 1106 to be executed on the device.

The application software on the computing-based device 1100 may include a 3D character generation module 1108 comprising computer executable instructions to control the operation of the device to generate or modify the mesh of the character using any one or more of the methods described above. The 3D character generation module 1108 may, for example, be part of an interactive software experience (e.g. a computer animation application or a computer game). Alternatively, or in addition, the method of generating or modifying the mesh described herein may be performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The computer executable instructions are provided using any computer-readable media that is accessible by computing based device 1100. Computer-readable media includes, for example, computer storage media such as memory 1110 and communications media. Computer storage media, such as memory 1110, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1110) is shown within the computing-based device 1100 it will be appreciated that the storage is, in some examples, distributed or located remotely and accessed via a network or other communication link (e.g. using communication interface 1112).

The memory 1110 may be configured to store the generated mesh 1111 and also the hierarchical data 1113 (e.g. the clothing portions and/or sets of blend shapes and associated parameters) which are used to generate or modify the mesh of the 3D character.

The computing-based device 1100 may also comprise an input/output controller 1114 arranged to output display information to a display device 1116 which may be separate from or integral to the computing-based device 1100. The display information may provide a graphical user interface (e.g. which displays the rendered character in an interactive experience, such as a computer game or animation). The input/output controller 1114 may also be arranged to receive and process input from one or more devices, such as a user input device (e.g. a mouse, keyboard, camera, microphone or other sensor). In some examples the user input (which may, for example, be used to trigger the generation of a new 3D character or to control the 3D character once generated) device detects voice input, user gestures or other user actions and provides a natural user interface (NUI). In an embodiment the display device 1116 also acts as the user input device if it is a touch sensitive display device. The input/output controller 1114 may also output data to devices other than the display device 1116.

Any of the input/output controller 1114, display device 1116 and any user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although the present examples are described and illustrated herein as being implemented in a computing device as shown in FIG. 11, the system described is provided as an example and not a limitation. As those skilled in the art will appreciate, the present examples are suitable for application in a variety of different types of computing systems.

A first further example provides a method of automatically generating a three-dimensional entity comprising: generating a sequence comprising two or more sets of blend shapes in order of increasing priority, each set of blend shapes comprising one or more blend shape identifiers and for each blend shape, one or more parameters defining candidate blend weights for the blend shape and wherein a set of blend shapes corresponds to a characteristic of the entity; for each of the sets of blend shapes in the sequence and in order of increasing priority: adding the one or more blend shape identifiers in the set to a set of blend shapes for the entity, in response to adding a blend shape identifier to the set for the entity that is not already present in that set, adding the parameters for the blend shape to the set for the entity and in response to adding a blend shape identifier to the set for the entity that is already present in that set, updating the parameters for the blend shape in the set for the entity based on the parameters for the blend shape in the set being added; applying one or more blend shapes from the set of blend shapes for the entity to a mesh of the entity using a randomization method; and storing the mesh of the entity.

Alternatively or in addition to the other examples described herein, the first further example may include any combination of the following:

The method may further comprise rendering the three-dimensional entity using the stored mesh.

The method may further comprise: in response to receiving a user input, repeating the application of one or more blend shapes from the set of blend shapes for the entity to a mesh of the entity using a randomization method to generate a second entity and storing the mesh of the second entity.

Generating a sequence comprising two or more sets of blend shapes in order of increasing priority may comprise: selecting a base set of blend shapes of a lowest priority; selecting one or more sets of blend shapes of a next level of priority; and selecting one or more further sets of blend shapes of at least one further level of priority.

Adding the one or more blend shape identifiers in the set to a set of blend shapes for the entity may comprise: determining if the sequence comprises a second set of blend shapes having an identical priority; in response to determining that the sequence does comprise a second set of blend shapes having an identical priority, generating a new set of blend shapes using a weighted average of the sets of blend shapes in the sequence having an identical priority and adding the one or more blend shape identifiers in the new set to the set of blend shapes for the entity; and in response to determining that the sequence does not comprise a second set of blend shapes having an identical priority, adding the one or more blend shape identifiers in the selected set to the set of blend shapes for the entity.

Applying a plurality of blend shapes from the set of blend shapes for the entity to a mesh of the entity using a randomization method may comprise: generating, from a seed value, a random number for each blend shape in the set of blend shapes for the entity; defining a blend weight for each blend shape in the set of blend shapes for the entity by mapping the random number for a blend shape into a range of candidate blend weights defined by the parameters for the blend shape in the set of blend shapes for the entity; and for each blend shape from the set of blend shapes for the entity, applying the blend shape to a mesh of the entity according to the defined blend weight for the blend shape.

Defining a blend weight for each blend shape in the set of blend shapes for the entity by mapping the random number for a blend shape into a range of candidate blend weights defined by the parameters for the blend shape in the set of blend shapes for the entity may comprise: selecting two or more blend shapes from the set of blend shapes for the entity; for each selected blend shape, determining if the selected blend shape is one of a pair of complementary blend shapes in the set of blend shapes for the entity; in response to determining that the selected blend shape is one of a pair of complementary blend shapes in the set of blend shapes for the entity, randomly selecting one of the blend shapes in the pair of complementary blend shapes to the mesh for the entity and setting the blend weight for the non-selected blend shape to zero; and defining a blend weight for the selected blend shape by mapping the random number for a blend shape into a range of candidate blend weights defined by the parameters for the blend shape in the set of blend shapes for the entity. A pair of complementary blend shapes may comprise two blend shapes that when applied to the mesh of the entity have an opposite effect on a part of the mesh.

Applying a plurality of blend shapes from the set of blend shapes for the entity to a mesh of the entity using a randomization method may comprise: selecting two or more blend shapes from the set of blend shapes for the entity; for each selected blend shape, determining if the selected blend shape is one of a pair of complementary blend shapes in the set of blend shapes for the entity; in response to determining that the selected blend shape is one of a pair of complementary blend shapes in the set of blend shapes for the entity, randomly selecting and applying only one of the blend shapes in the pair of complementary blend shapes to the mesh for the entity; and in response to determining that the selected blend shape is not one of a pair of complementary blend shapes in the set of blend shapes for the entity, applying the selected blend shape to the mesh for the entity.

Applying a plurality of blend shapes from the set of blend shapes for the entity to a mesh of the entity using a randomization method may comprise: randomly selecting one blend shape from each group of blend shapes within the set of blend shapes for the entity; and applying the selected blend shape to a mesh of the entity according to a maximum blend weight defined by the blend parameters for the blend shape.

The one or more parameters defining candidate blend weights for the blend shape may comprise one or more of: data defining a range of candidate blend weights; a parameter configured to reduce the range of candidate blend weights if the blend shape is already present in the set of blend shapes for the entity; and data specifying compatibility of the blend shape with another set of blend shapes.

The method may further comprise: randomly selecting a coordinate within a two-dimensional grid of nodes, each node corresponding to a blend shape; identifying three nodes that are closest to the coordinate; mapping a triangle defined by the three nodes into an equilateral triangle; and applying blend shapes corresponding to the three nodes to the mesh of the entity using blend weights calculated based on a distance between the coordinate and the corresponding node in the equilateral triangle.

The method may further comprise: generating the mesh of the entity prior to applying the plurality of blend shapes. Generating the mesh of the entity may comprise: for each slot in a set of candidate slots, each slot corresponding to a part of the body of the entity: selecting a slot with a highest priority value from a set of candidate slots; determining if the selected slot is covered with clothing; in response to determining that the selected slot is not covered with clothing, adding the slot to a set of empty slots and removing the selected slot from the set of candidate slots; and in response to determining that the selected slot is covered with clothing, selecting a clothing portion corresponding to the selected slot, wherein the selection is dependent upon any clothing portions already added in an adjacent slot, adding the selected clothing portion to the mesh of the entity and removing the selected slot from the set of candidate slots; and for each slot in the set of empty slots, adding a skin portion corresponding to the selected slot to the mesh of the entity.

The method may further comprise: animating, in real-time, the three-dimensional entity using the stored mesh.

The three-dimensional entity may be a three-dimensional character.

A second further example provides a computing device comprising: a processor; and a memory arranged to store device executable instructions that, when executed by the processor, cause the processor to: generate a sequence comprising two or more sets of blend shapes in order of increasing priority, each set of blend shapes comprising one or more blend shape identifiers and for each blend shape, one or more parameters defining candidate blend weights for the blend shape and wherein a set of blend shapes corresponds to a characteristic of the entity; for each of the sets of blend shapes in the sequence and in order of increasing priority: add the one or more blend shape identifiers in the set to a set of blend shapes for the entity, in response to adding a blend shape identifier to the set for the entity that is not already present in that set, add the parameters for the blend shape to the set for the entity and in response to adding a blend shape identifier to the set for the entity that is already present in that set, update the parameters for the blend shape in the set for the entity based on the parameters for the blend shape in the set being added; apply one or more blend shapes from the set of blend shapes for the entity to a mesh of the entity using a randomization method; and store the mesh of the entity in the memory.

Alternatively or in addition to the other examples described herein, the second further example may include any combination of the features listed above and/or any combination of the following features:

The memory may be further arranged to store device executable instructions that, when executed by the processor, cause the processor to: render the three-dimensional entity using the stored mesh.

Applying a plurality of blend shapes from the set of blend shapes for the entity to a mesh of the entity using a randomization method may comprise: generating, from a seed value, a random number for each blend shape in the set of blend shapes for the entity; defining a blend weight for each blend shape in the set of blend shapes for the entity by mapping the random number for a blend shape into a range of candidate blend weights defined by the parameters for the blend shape in the set of blend shapes for the entity; and for each blend shape from the set of blend shapes for the entity, applying the blend shape to a mesh of the entity according to the defined blend weight for the blend shape.

The three-dimensional entity may be a three-dimensional character.

A third further example provides a method of generating a mesh of a three-dimensional entity comprising: receiving data identifying a plurality of clothing items to be added to the mesh, each clothing item comprising one or more groups of clothing portions; selecting clothing items from the plurality of clothing items in order of priority and for each selected clothing item, selecting a clothing portion from each group that overlaps a maximum number of available slots on the mesh of the three-dimensional entity and adding the selected portion to the mesh of the three-dimensional entity; after adding all the clothing items in the plurality of clothing items, adding a skin portion to any remaining available slots on the mesh of the three-dimensional entity; and storing the mesh for the three-dimensional entity.

Alternatively or in addition to the other examples described herein, the third further example may include any combination of the features listed above and/or any combination of the following features:

The method may further comprise rendering the three-dimensional entity using the stored mesh.

The three-dimensional entity may be a three-dimensional character.

A fourth further example provides a method of generating a mesh of a three-dimensional entity comprising: randomly selecting a coordinate within a two-dimensional grid of nodes, each node corresponding to a blend shape; identifying three nodes that are closest to the coordinate; mapping a triangle defined by the three nodes into an equilateral triangle; and applying blend shapes corresponding to the three nodes to the mesh of the entity using blend weights calculated based on a distance between the coordinate and the corresponding node in the equilateral triangle.

Alternatively or in addition to the other examples described herein, the fourth further example may include any combination of the features listed above and/or any combination of the following features:

The method may further comprise rendering the three-dimensional entity using the stored mesh.

The three-dimensional entity may be a three-dimensional character.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method of automatically generating a three-dimensional entity comprising:
generating a sequence comprising two or more sets of blend shapes in order of increasing priority, each set of blend shapes comprising one or more blend shape identifiers and for each blend shape, one or more parameters defining candidate blend weights for the blend shape and wherein a set of blend shapes corresponds to a characteristic of the entity;
for each of the sets of blend shapes in the sequence and in order of increasing priority: adding the one or more blend shape identifiers in the set to a set of blend shapes for the entity, in response to adding a blend shape identifier to the set for the entity that is not already present in that set, adding the parameters for the blend shape to the set for the entity and in response to adding a blend shape identifier to the set for the entity that is already present in that set, updating the parameters for the blend shape in the set for the entity based on the parameters for the blend shape in the set being added;
applying one or more blend shapes from the set of blend shapes for the entity to a mesh of the entity using a randomization method, including by generating, from a seed value, a random number for each blend shape in the set of blend shapes for the entity, defining a blend weight for each blend shape in the set of blend shapes for the entity by mapping the random number for a blend shape into a range of candidate blend weights defined by the parameters for the blend shape in the set of blend shapes for the entity, and for each blend shape from the set of blend shapes for the entity, applying the blend shape to a mesh of the entity according to the defined blend weight for the blend shape; and storing the mesh of the entity.

2. The method according to claim 1, further comprising: rendering the three-dimensional entity using the stored mesh.

3. The method according to claim 1, further comprising: in response to receiving a user input, repeating the application of one or more blend shapes from the set of blend shapes for the entity to a mesh of the entity using a randomization method to generate a second entity and storing the mesh of the second entity.

4. The method according to claim 1, wherein generating a sequence comprising two or more sets of blend shapes in order of increasing priority comprises:
   selecting a base set of blend shapes of a lowest priority;
   selecting one or more sets of blend shapes of a next level of priority; and
   selecting one or more further sets of blend shapes of at least one further level of priority.

5. The method according to claim 1, wherein adding the one or more blend shape identifiers in the set to a set of blend shapes for the entity comprises:
   determining if the sequence comprises a second set of blend shapes having an identical priority;
   in response to determining that the sequence does comprise a second set of blend shapes having an identical priority, generating a new set of blend shapes using a weighted average of the sets of blend shapes in the sequence having an identical priority and adding the one or more blend shape identifiers in the new set to the set of blend shapes for the entity; and
   in response to determining that the sequence does not comprise a second set of blend shapes having an identical priority, adding the one or more blend shape identifiers in the selected set to the set of blend shapes for the entity.

6. The method according to claim 1, wherein defining a blend weight for each blend shape in the set of blend shapes for the entity by mapping the random number for a blend shape into a range of candidate blend weights defined by the parameters for the blend shape in the set of blend shapes for the entity comprises:
   selecting two or more blend shapes from the set of blend shapes for the entity; for each selected blend shape, determining if the selected blend shape is one of a pair of complementary blend shapes in the set of blend shapes for the entity;
   in response to determining that the selected blend shape is one of a pair of complementary blend shapes in the set of blend shapes for the entity, randomly selecting one of the blend shapes in the pair of complementary blend shapes to the mesh for the entity and setting the blend weight for the non-selected blend shape to zero; and
   defining a blend weight for the selected blend shape by mapping the random number for a blend shape into a range of candidate blend weights defined by the parameters for the blend shape in the set of blend shapes for the entity.

7. The method according to claim 6, wherein a pair of complementary blend shapes comprises two blend shapes that when applied to the mesh of the entity have an opposite effect on a part of the mesh.

8. The method according to claim 1, wherein applying a plurality of blend shapes from the set of blend shapes for the entity to a mesh of the entity using a randomization method comprises:
   selecting two or more blend shapes from the set of blend shapes for the entity;
   for each selected blend shape, determining if the selected blend shape is one of a pair of complementary blend shapes in the set of blend shapes for the entity;
   in response to determining that the selected blend shape is one of a pair of complementary blend shapes in the set of blend shapes for the entity, randomly selecting and applying only one of the blend shapes in the pair of complementary blend shapes to the mesh for the entity; and
   in response to determining that the selected blend shape is not one of a pair of complementary blend shapes in the set of blend shapes for the entity, applying the selected blend shape to the mesh for the entity.

9. The method according to claim 1, wherein applying a plurality of blend shapes from the set of blend shapes for the entity to a mesh of the entity using a randomization method comprises:
   randomly selecting one blend shape from each group of blend shapes within the set of blend shapes for the entity; and
   applying the selected blend shape to a mesh of the entity according to a maximum blend weight defined by the blend parameters for the blend shape.

10. The method according to claim 1, wherein the one or more parameters defining candidate blend weights for the blend shape comprises one or more of:
    data defining a range of candidate blend weights;
    a parameter configured to reduce the range of candidate blend weights if the blend shape is already present in the set of blend shapes for the entity; and
    data specifying compatibility of the blend shape with another set of blend shapes.

11. The method according to claim 1, further comprising:
    randomly selecting a coordinate within a two-dimensional grid of nodes, each node corresponding to a blend shape;
    identifying three nodes that are closest to the coordinate;
    mapping a triangle defined by the three nodes into an equilateral triangle; and
    applying blend shapes corresponding to the three nodes to the mesh of the entity using blend weights calculated based on a distance between the coordinate and the corresponding node in the equilateral triangle.

12. The method according to claim 1, further comprising:
    generating the mesh of the entity prior to applying the plurality of blend shapes.

13. The method according to claim 12, wherein generating the mesh of the entity comprises:
    for each slot in a set of candidate slots, each slot corresponding to a part of the body of the entity:
       selecting a slot with a highest priority value from a set of candidate slots;
       determining if the selected slot is covered with clothing;
       in response to determining that the selected slot is not covered with clothing, adding the slot to a set of empty slots and removing the selected slot from the set of candidate slots; and
       in response to determining that the selected slot is covered with clothing, selecting a clothing portion corresponding to the selected slot, wherein the selection is dependent upon any clothing portions already added in an adjacent slot, adding the selected clothing portion to the mesh of the entity and removing the selected slot from the set of candidate slots; and for each slot in the set of empty slots, adding a skin portion corresponding to the selected slot to the mesh of the entity.

14. The method according to claim 1, further comprising: animating, in real-time, the three-dimensional entity using the stored mesh.

15. The method of claim 1, further comprising:
receiving data identifying a plurality of clothing items to be added to the mesh, each clothing item comprising one or more groups of clothing portions;
selecting clothing items from the plurality of clothing items in order of priority and for each selected clothing item, selecting a clothing portion from each group that overlaps a maximum number of available slots on the mesh of the three-dimensional entity and adding the selected portion to the mesh of the three-dimensional entity;
after adding all the clothing items in the plurality of clothing items, adding a skin portion to any remaining available slots on the mesh of the three-dimensional entity; and
storing the mesh for the three-dimensional entity.

16. A computing device comprising:
a processor; and
a memory arranged to store device executable instructions that, when executed by the processor, cause the processor to:
generate a sequence comprising two or more sets of blend shapes in order of increasing priority, each set of blend shapes comprising one or more blend shape identifiers and for each blend shape, one or more parameters defining candidate blend weights for the blend shape and wherein a set of blend shapes corresponds to a characteristic of the entity;
for each of the sets of blend shapes in the sequence and in order of increasing priority: add the one or more blend shape identifiers in the set to a set of blend shapes for the entity, in response to adding a blend shape identifier to the set for the entity that is not already present in that set, add the parameters for the blend shape to the set for the entity and in response to adding a blend shape identifier to the set for the entity that is already present in that set, update the parameters for the blend shape in the set for the entity based on the parameters for the blend shape in the set being added;
apply one or more blend shapes from the set of blend shapes for the entity to a mesh of the entity using a randomization method, including by generating, from a seed value, a random number for each blend shape in the set of blend shapes for the entity, defining a blend weight for each blend shape in the set of blend shapes for the entity by mapping the random number for a blend shape into a range of candidate blend weights defined by the parameters for the blend shape in the set of blend shapes for the entity, and for each blend shape from the set of blend shapes for the entity, applying the blend shape to a mesh of the entity according to the defined blend weight for the blend shape; and
store the mesh of the entity in the memory.

17. The computing device according to claim 16, wherein the memory is further arranged to store device executable instructions that, when executed by the processor, cause the processor to:
render the three-dimensional entity using the stored mesh.

18. One or more computer storage devices having computer executable instructions stored thereon for generating a mesh of a three-dimensional entity, which, on execution by a computer, cause the computer to perform operations comprising:
generating a sequence comprising two or more sets of blend shapes in order of increasing priority, each set of blend shapes comprising one or more blend shape identifiers and for each blend shape, one or more parameters defining candidate blend weights for the blend shape and wherein a set of blend shapes corresponds to a characteristic of the entity;
for each of the sets of blend shapes in the sequence and in order of increasing priority: adding the one or more blend shape identifiers in the set to a set of blend shapes for the entity, in response to adding a blend shape identifier to the set for the entity that is not already present in that set, adding the parameters for the blend shape to the set for the entity and in response to adding a blend shape identifier to the set for the entity that is already present in that set, updating the parameters for the blend shape in the set for the entity based on the parameters for the blend shape in the set being added;
applying one or more blend shapes from the set of blend shapes for the entity to a mesh of the entity using a randomization method, including by generating, from a seed value, a random number for each blend shape in the set of blend shapes for the entity, defining a blend weight for each blend shape in the set of blend shapes for the entity by mapping the random number for a blend shape into a range of candidate blend weights defined by the parameters for the blend shape in the set of blend shapes for the entity, and for each blend shape from the set of blend shapes for the entity, applying the blend shape to a mesh of the entity according to the defined blend weight for the blend shape; and
storing the mesh of the entity.

19. The one or more storage devices of claim 18 wherein the operations further comprise:
rendering the three-dimensional entity using the stored mesh.

20. The one or more computer storage devices of claim 18 wherein the operations further comprise:
receiving data identifying a plurality of clothing items to be added to the mesh, each clothing item comprising one or more groups of clothing portions;
selecting clothing items from the plurality of clothing items in order of priority and for each selected clothing item, selecting a clothing portion from each group that overlaps a maximum number of available slots on the mesh of the three-dimensional entity and adding the selected portion to the mesh of the three-dimensional entity;
after adding all the clothing items in the plurality of clothing items, adding a skin portion to any remaining available slots on the mesh of the three-dimensional entity; and
storing the mesh for the three-dimensional entity.

* * * * *